(No Model.)
J. G. WHITLOCK.
SAD IRON.
No. 338,457. Patented Mar. 23, 1886.
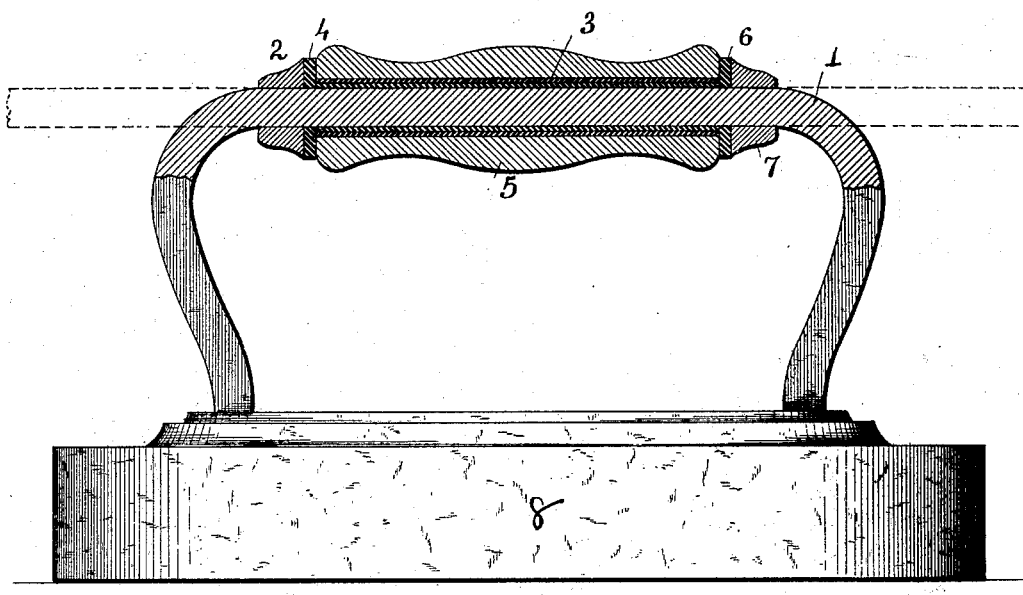
ATTEST.
J. Henry Kaiser.
Harry L. Ames.
INVENTOR.
James G. Whittock.
By Knight Bros
Attys.

UNITED STATES PATENT OFFICE.

JAMES G. WHITLOCK, OF RICHMOND, VIRGINIA.

SAD-IRON.

SPECIFICATION forming part of Letters Patent No. 338,457, dated March 23, 1886.

Application filed March 17, 1885. Serial No. 159,218. (No model.)

*To all whom it may concern:*

Be it known that I, JAMES G. WHITLOCK, a citizen of the United States, residing at Richmond, in the county of Henrico and State of Virginia, have invented certain new and useful Improvements in Handles for Sad-Irons, Kettles, and the like, of which the following is a specification.

The object of my invention is to provide a handle for sad-irons, tea-kettles, or any handle of like construction which is ordinarily exposed to heat, so protected from the conduction of heat that it will not become too hot to hold in the hand.

My improvement consists in interposing a body of asbestus between the hold or handle proper and its metallic attachments, so as to prevent the direct conduction of heat.

The accompanying drawing is a side elevation of a sad-iron having my improved handle applied thereto, the handle being shown partly in vertical longitudinal section on a central line and partly in side elevation.

The handle-stem 1 is formed originally of a straight bar of iron, as shown in dotted lines, with a collar, 2, welded thereon. The central part of the handle bar or stem is wrapped in several thicknesses with sheet-asbestus, as shown at 3, and an asbestus washer, 4, is applied on the inner face of the collar 2. The hold or handle proper, 5, is then slipped on and a second asbestus washer, 6, is placed at its other end, after which the second fixed metallic collar, 7, is applied, permanently securing the whole in place. The extremities of the handle rod or stem 1 are then bent down to the permanent position shown, and secured to the sad-iron 8 or other object, either permanently or movably, as may be desired.

My invention is equally applicable to irons made with changeable handles or to those in which the handles are permanently fixed by casting the iron on the ends of the handle-stem.

Having thus described my invention, the following is what I claim as new therein and desire to secure by Letters Patent:

The combination of the handle-stem 1, collars 2 7, non-conducting wrapping 3, non-conducting washers 4 6, and the handle 5, separated from contact with the handle-stem 1 by the said non-conducting wrapping and washers, as and for the purposes herein set forth.

JAMES G. WHITLOCK.

Witnesses:
OCTAVIUS KNIGHT,
HARRY E. KNIGHT,